US007984383B2

United States Patent
Schell et al.

(10) Patent No.: US 7,984,383 B2
(45) Date of Patent: Jul. 19, 2011

(54) APPARATUS AND METHOD FOR USING A PANEL LAYOUT TO CONSOLIDATE DYNAMIC AND INTERACTIVE GRAPHICS REPRESENTATIVE OF INPUT AND OUTPUT DATA

(75) Inventors: Justin Mark Schell, San Diego, CA (US); Santiago Becerra, Sr., Del Mar, CA (US); William Justin Cox, San Diego, CA (US); Brian Eric Mantuano, Visalia, CA (US); Jaime Zuluaga, Fremont, CA (US)

(73) Assignee: Business Objects Software, Ltd., Dublin (IE)

( * ) Notice: Subject to any disclaimer, the term of this patent is extended or adjusted under 35 U.S.C. 154(b) by 325 days.

(21) Appl. No.: 11/413,979

(22) Filed: Apr. 28, 2006

(65) Prior Publication Data

US 2007/0256024 A1 Nov. 1, 2007

(51) Int. Cl.
*G06F 3/048* (2006.01)
(52) U.S. Cl. ........ 715/771; 715/240; 715/243; 715/762; 715/763
(58) Field of Classification Search .................. 715/240, 715/243, 762, 763, 771
See application file for complete search history.

(56) References Cited

U.S. PATENT DOCUMENTS

| | | | | |
|---|---|---|---|---|
| 5,060,170 A * | 10/1991 | Bourgeois et al. | ............ | 715/788 |
| 5,381,523 A * | 1/1995 | Hayashi | ........................ | 715/204 |
| 5,553,211 A * | 9/1996 | Uotani | ........................... | 345/641 |
| 5,798,752 A * | 8/1998 | Buxton et al. | ................. | 715/863 |
| 6,031,989 A * | 2/2000 | Cordell | .......................... | 717/109 |
| 6,266,684 B1 * | 7/2001 | Kraus et al. | ..................... | 715/209 |
| 6,874,128 B1 * | 3/2005 | Moore et al. | ................... | 715/792 |
| 7,032,179 B2 * | 4/2006 | Mack et al. | ..................... | 715/762 |
| 7,071,940 B2 * | 7/2006 | Malik | ........................... | 345/440 |
| 7,246,306 B2 * | 7/2007 | Chen et al. | ..................... | 715/205 |
| 2002/0051080 A1 * | 5/2002 | Tanaka | ........................... | 348/552 |
| 2003/0070142 A1 * | 4/2003 | Drake et al. | ................... | 715/513 |
| 2003/0169295 A1 * | 9/2003 | Becerra, Jr. | ................... | 345/765 |
| 2004/0066414 A1 * | 4/2004 | Czerwinski et al. | .......... | 345/781 |
| 2004/0085316 A1 * | 5/2004 | Malik | ........................... | 345/440 |
| 2004/0181543 A1 * | 9/2004 | Wu et al. | ........................ | 707/102 |
| 2004/0205513 A1 * | 10/2004 | Chen et al. | .................. | 715/501.1 |
| 2005/0086587 A1 * | 4/2005 | Balz | ............................. | 715/505 |
| 2005/0289109 A1 * | 12/2005 | Arrouye et al. | .................... | 707/1 |
| 2006/0203294 A1 * | 9/2006 | Makino | ........................ | 358/400 |
| 2006/0253792 A1 * | 11/2006 | Grace et al. | .................... | 715/771 |
| 2007/0101297 A1 * | 5/2007 | Forstall et al. | ................ | 715/841 |
| 2007/0234206 A1 * | 10/2007 | Yamabuchi et al. | .......... | 715/526 |
| 2007/0239573 A1 * | 10/2007 | Tien et al. | ........................ | 705/35 |
| 2007/0294073 A1 * | 12/2007 | Okamoto et al. | ............... | 703/20 |

* cited by examiner

*Primary Examiner* — Tadeese Hailu
*Assistant Examiner* — Patrick F Riegler
(74) *Attorney, Agent, or Firm* — Mintz, Levin, Cohn, Ferris, Glovsky and Popeo, P.C.

(57) ABSTRACT

A computer readable medium includes executable instructions to select a panel layout with panels specified in combination. Interactive graphic files representative of input and output values for panels within the panel layout are selected. The interactive graphic files are associated with panels in the panel layout. A composite interactive graphic file representative of input and output values for the interactive graphic files representative of input and output values that have been associated with the panel layout is generated.

22 Claims, 12 Drawing Sheets

US 7,984,383 B2

APPARATUS AND METHOD FOR USING A PANEL LAYOUT TO CONSOLIDATE DYNAMIC AND INTERACTIVE GRAPHICS REPRESENTATIVE OF INPUT AND OUTPUT DATA

BRIEF DESCRIPTION OF THE INVENTION

This invention relates generally to creating and using dynamic and interactive graphics representative of input and output data. More particularly, this invention relates to using a panel layout to consolidate dynamic and interactive graphics representative of input and output data and provide flexible access to the representative graphics generated within a panel layout.

BACKGROUND OF THE INVENTION

Business Objects Americas of San Jose, Calif., sells a tool called Crystal Xcelsius™ to create interactive graphics representative of input and output data. This tool enables users to create interactive graphics representative of input and output data. These interactive graphics are created using a design tool that provides graphic components which the user associates with data values and that can be exported, integrated in other documents and portal environments, and distributed widely.

One of the challenges for a user who is creating interactive graphics representative of input and output data is how to combine the various graphic components. In current embodiments, the user works with a single panel and either combines multiple interactive graphics within one layout, or uses a third party presentation tool such as Microsoft PowerPoint™ or a web page layout to structure the combination of multiple interactive control panels. Although templates and samples are provided to illustrate possible layout combinations, these templates do not enable the user to easily combine existing interactive control panel components.

In the prior art, if there is a desire to combine the content from existing interactive control panels this is done manually based on the original canvas files, by structuring the layout using a third party tool, or by sending two separate files to an end user. FIG. 1 illustrates a prior art workflow for combining interactive control panels. Initially, a user (e.g., a designer) works with a canvas to add graphic components linked to data sources 100. An interactive control panel is then generated for the canvas 102. Another user (e.g., an end user) then views and interacts with the interactive control panel 104. It is then determined whether to combine the interactive control panel with another existing interactive control panel 106. If not, processing is done 107. If so, it is determined whether a single interactive control panel file should be used 108. If so, a user opens a new canvas and manually combines the interactive control panel file elements from those files 110. If not, the user sends the interactive control panels as separate files or inserts them in a third-party application as separate files 112.

With existing technology, a user is unable to specify more than one content layer for a section on the panel. The content displayed in a region of the panel is currently specified as one specific interactive graphic. There is no ability for the end user to toggle the content displayed in a region or pane within a panel.

Although the use of layout structures as provided in applications such as Microsoft PowerPoint™ and Microsoft Word™ is known in the prior art, this use of layout templates is different than the use of a layout template to generate an interactive graphic representative of input and output values. In the case of applications, such as Microsoft PowerPoint™ and Microsoft Word™, the layout panel is designed to combine content within an existing document rather than to enable the combination of generated files into a newly generated file. Additionally, there is no mechanism to assign more than one content file to a single panel within the panel layout or to generate an output that enables an end user to toggle between multiple content elements specified for a single panel within the layout.

In view of the foregoing, it would be desirable to provide improved techniques for combining control panels for interactive graphics representative of input and output data in a single layout control panel. Additionally, it would be advantageous to enable the end user of the layout control panel to select alternative control panel content for regions within the layout control panel.

SUMMARY OF THE INVENTION

The invention includes a computer readable medium with executable instructions to select a panel layout with panels specified in combination. Interactive graphic files representative of input and output values for panels within the panel layout are selected. The interactive graphic files are associated with panels in the panel layout. A composite interactive graphic file representative of input and output values for the interactive graphic files representative of input and output values that have been associated with the panel layout is generated.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
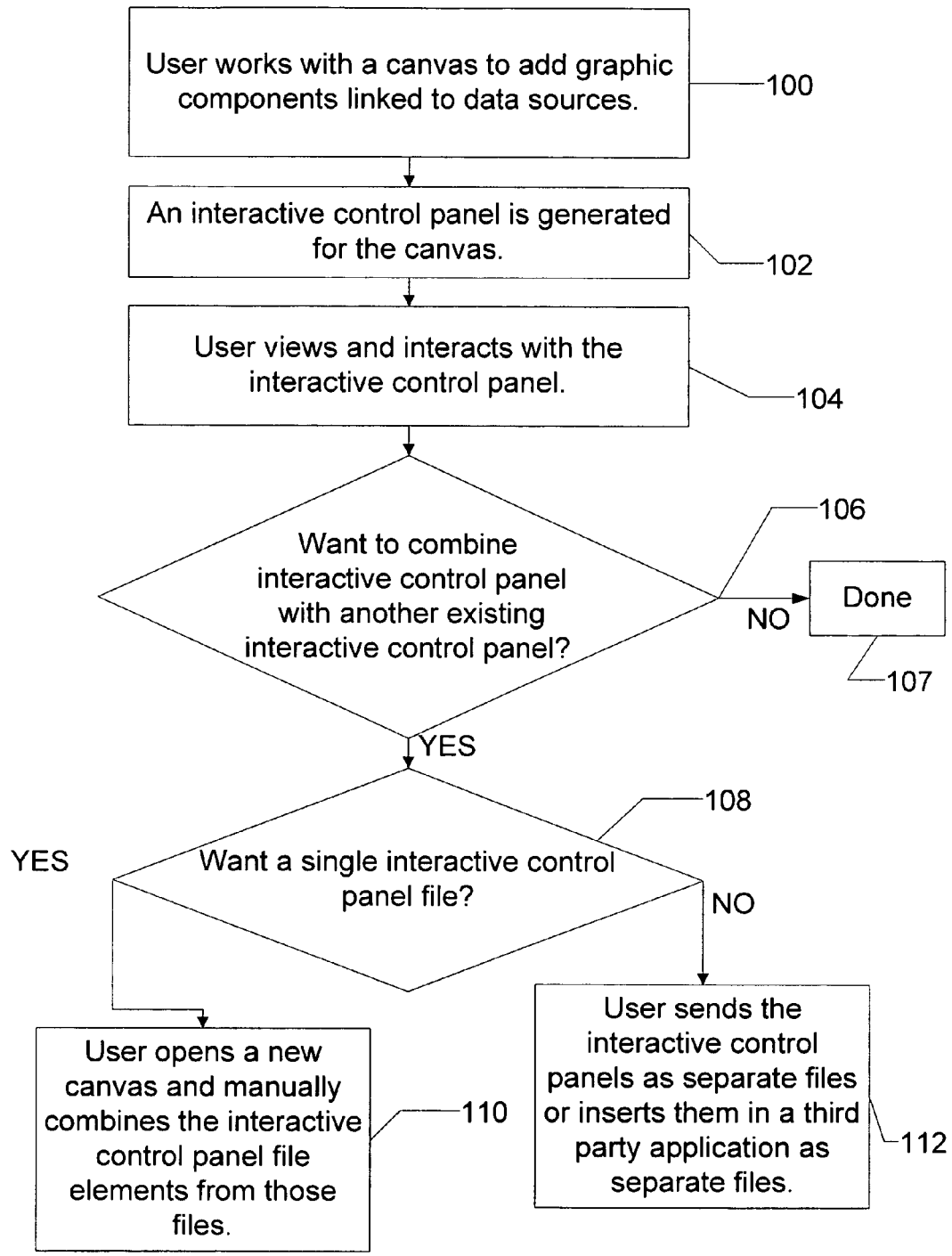
FIG. 1 illustrates a prior art approach to combining interactive control panels.

The following terminology is used while disclosing embodiments of the invention:

Canvas is the term for a graphical user interface (GUI) workspace in which a user places selected graphical components and associates the selected graphic components with data values. The canvas can be saved as working file or be used to generate an interactive control panel that represents the canvas.

Graphic Component is the term for a graphical element such as a chart (e.g., line, pie, column, bar, combination, bubble, XY, area, radar and the like), single value representation (e.g., dial, slider, progress bar, gauge, value, spinner, play button and the like), selector (e.g., combo box, list box, label based menu, radio button, fish-eye menu, sliding picture menu, table, ticker, check box, icon, toggle button, filter, list builder, accordion menu and the like) geographic map, collaboration element, calendar, text box and the like. These graphical components are typically predefined and are provided to the designer who can modify aspects of the graphic component and associate the graphic component with data values.

Data values are data items that are associated with graphic components. Data values may represent discrete values, ranges, strings, calculated values and the like. The data values may be based on a separate application document such as a Microsoft Excel™ document or another data source such as a database, RSS feed and the like.

Interactive Control Panel is the interactive form of the canvas that is generated from the canvas. In one embodiment of the invention, the interactive control panel is generated as a Macromedia Flash™ file (.swf) that is executable as a standalone application or as a plug-in program that is available on a variety of platforms for a variety of web browsers. An interactive control panel can be understood as an interactive graphics representative of input and output data.

Panel Layout Canvas is a specialized form of the canvas that enables a user to select a layout that represents a framework for combining panel shapes, and to associate existing interactive control panels with regions (also referred to as panels) within the framework of the panel layout canvas. In one embodiment of the invention, the panel layout canvas allows the designer to associate multiple interactive control panels with a single panel in the layout.

Layout Interactive Control Panel is an interactive control panel that is created using the panel layout canvas to combine multiple interactive control panels. The layout interactive control panel is generated to create an identical output format as a simple interactive control panel with the significant difference being the workflow that enables the user to create this panel from existing interactive control panels.

Layer of Content describes a single layer of interactive control panel content within a panel in a layout interactive control panel. In one embodiment of the invention, multiple layers of content can be associated with one or more of the panels within a panel layout canvas and can be displayed in the resulting layout interactive control panel in various ways depending on the embodiment of the invention. A layer of content can contain an image file, an interactive control file, or a canvas that may contain graphic components and the like.

Designer User describes the user who creates a canvas by selecting graphic components, positioning graphic components on a canvas, optionally modifying aspects of the graphic component, and associating the graphic component with data values.

End User describes the user who views the interactive control panel. The end user and designer user may be the same user.

Figure 2:
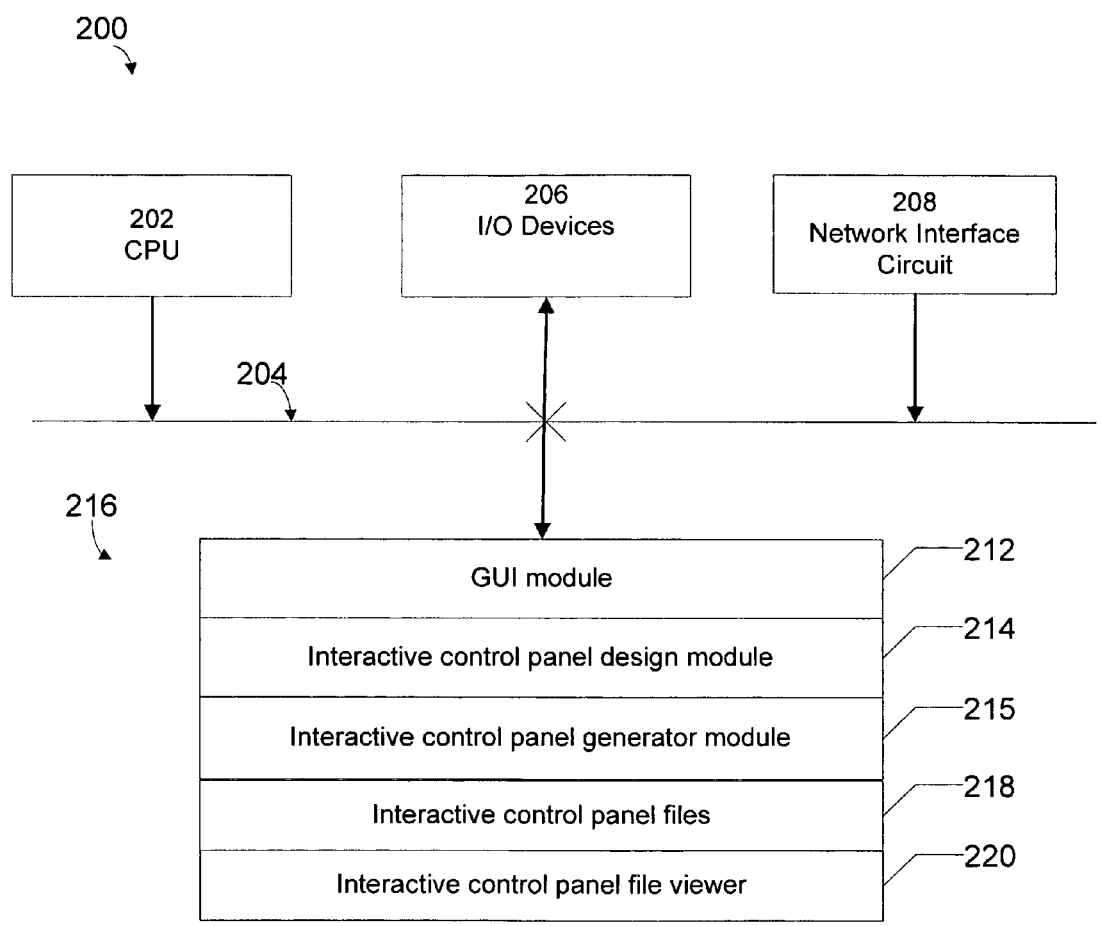
FIG. 2 illustrates a computer configured in accordance with an embodiment of the invention.

FIG. 2 illustrates a computer 200 configured in accordance with an embodiment of the invention. The computer 200 has standard components including a central processing unit 202, a bus 204, input/output devices 206, and an optional network interface circuit 208. The input/output devices 206 may include devices such as a keyboard, mouse, a display, such as monitor and the like.

The optional network interface circuit 208 facilitates communications with networked computers (not shown). The computer 200 also includes a memory 216. The memory 216 includes executable instructions to implement operations of the invention.

In the example of FIG. 2, the memory 216 includes a GUI module 212 to facilitate the display of graphics, an interactive control panel design module 214 to facilitate the design of interactive control panels using predefined graphic components that can be associated with data values, and a interactive control panel generator module 215 to facilitate generating interactive control panel files from the design module. Interactive control panel files 218 are also stored in memory. These files can be viewed and interacted with using an interactive control panel file viewer 220.

For the purposes of illustration, the components are shown on a single computer. Modules may be located on different computers, and interactive control panel files are designed to be distributed and viewed on multiple computers using an interactive control panel file viewer. It is the functions of the modules that are significant, not where they are performed or the specific manner in which they are performed.

Figure 3:
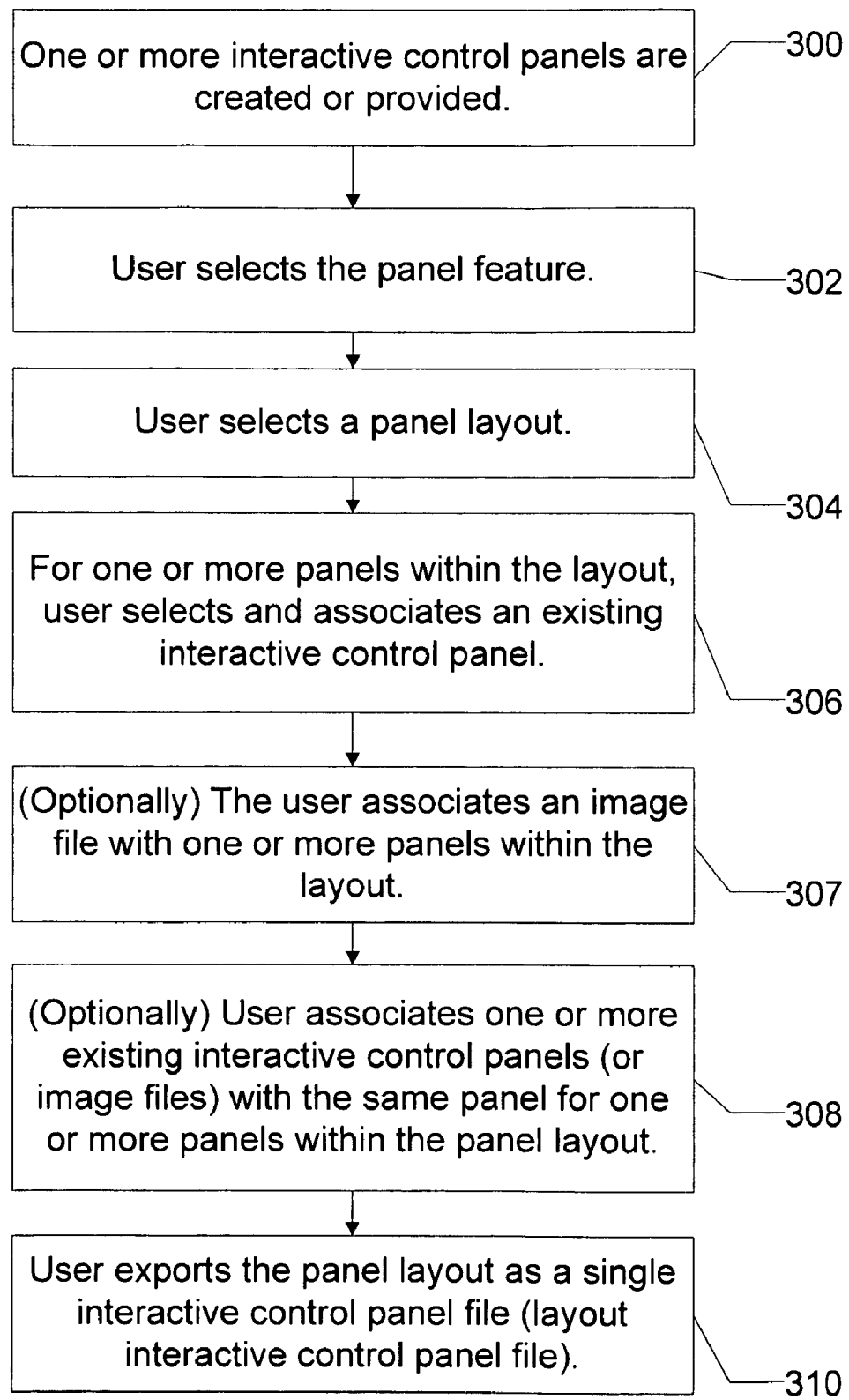
FIG. 3 illustrates a workflow for creating a layout interactive computer panel in accordance with an embodiment of the invention.

FIG. 3 illustrates the workflow for an embodiment of the invention. One or more interactive control panels are created or provided 300. These interactive control panels might be generated using a canvas to combine graphic components with data values to generate an interactive control panel. These interactive control panels may be created by different users on different systems or be provided as part of the system as predefined interactive control panels. The interactive control panel files need not be stored on the same machine or in the same repository.

The user (e.g., designer user) selects the panel feature 302 and is provided with a panel layout canvas. The user selects a predefined panel layout 304 to provide the structure for the panel layout canvas. In one embodiment of the invention, the user can customize aspects of the predefined panel layout by dragging frames to resize the panel frame dimensions or by specifying aspects such as border width and/or style between the panels in the layout. For one or more of the panels in the layout, the user selects and associates an existing interactive control panel 306. In one embodiment of the invention, the user also accepts or specifies a name to represent the interactive control frame that is within that panel within the layout. Optionally, the user associates an image file with one or more panels within the layout 307.

Optionally, the user associates more than one existing interactive control panel with the same panel for one or more panels within the panel layout 308. In one embodiment of the invention, a name specified for the interactive control panel content is used to toggle which interactive control panel content is displayed in a panel within the panel layout of a layout interactive control panel.

The user then generates a single interactive control panel that incorporates the content of the interactive control panels combined within the panel layout canvas. In one embodiment of the invention, when more than one interactive control panel is specified for a panel within the panel layout, these more than one interactive control panels are available to the end user by toggling the content displayed in the panel. In one embodiment of the invention, the toggling of the content displayed in the layout panel that has more than one interactive control panel toggles automatically without user input. In another embodiment, the toggling is performed manually by the end user selecting and switching which content is displayed in the panel. In one embodiment of the invention, the user can specify the characteristics of the automatic toggling behavior when compiling the single interactive control panel that is generated from the layout panel canvas. The characteristics of the automatic toggling behavior may include receiving an input value, a time setting, or another option. In another embodiment of the invention, the user selects which content to display in each panel when generating the single interactive control panel output file and is able to use the panel layout canvas as a single template for multiple interactive control panel files that contain different interactive control file content within the same structure. In this way, the user can generate multiple interactive control files based on displaying different sets of interactive control panels from the same layout interactive panel canvas. Finally, a user can export the panel layout as a single interactive control panel file 310.

Figure 4:
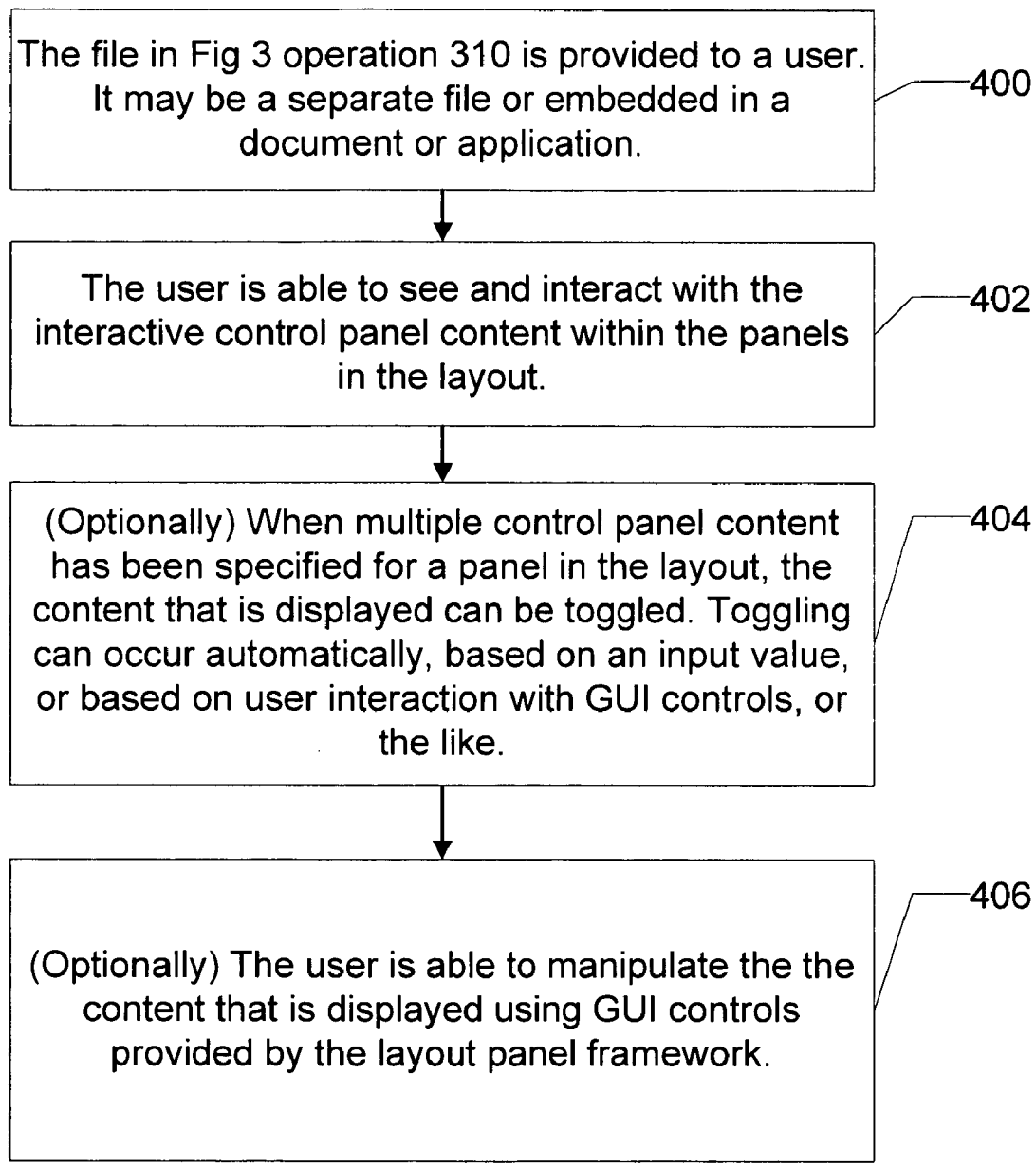
FIG. 4 illustrates a workflow using a layout interactive control panel associated with an embodiment of the invention.

FIG. 4 illustrates the workflow for an embodiment of the invention. A user is provided with the single interactive control panel file that was generated in operation 310 of FIG. 3. This single file combines the pre-existing interactive control panels specified by the user in a layout together. This file may be provided to the user as a separate file, or the file may be embedded in another document or application 400. The user is able to view and interact with this layout interactive control panel and with the interactive control panels within the panels of the layout. Interacting with the layout interactive control panel may include interactions a user has with a regular single panel single layer interactive control panel (such as entering a value by typing or adjusting a gauge or other value to change an input or projected value) 402. In one embodiment of the invention, content is toggled such that when more than one interactive control panel is associated with a panel in the layout, different interactive control panels can be displayed in the panel 402. This toggling may be configured to occur automatically, based on an input parameter, or based on a user interaction with the GUI 404. In one embodiment of the invention, additional functionality is provided by the panel layout itself 406. The additional functionality may include enabling an end user to toggle the content that is displayed within a panel, expanding one of the panels to fill the entire panel layout shape or contracting the panel such that it fills its original panel within the layout shape. The user may specify interactions between the panels, such as connecting an output value in one panel to a second panel as an input value.

Optionally, when more than one interactive control panel has been specified for a panel during the design phase, the end user is able to toggle which of the more than one interactive panels is displayed. This toggling may be based on the user manually selecting and switching the content that is displayed. Alternately, the interactive control panel content may be configured to automatically toggle based on an input value, a time setting, or another option.

Figure 5:
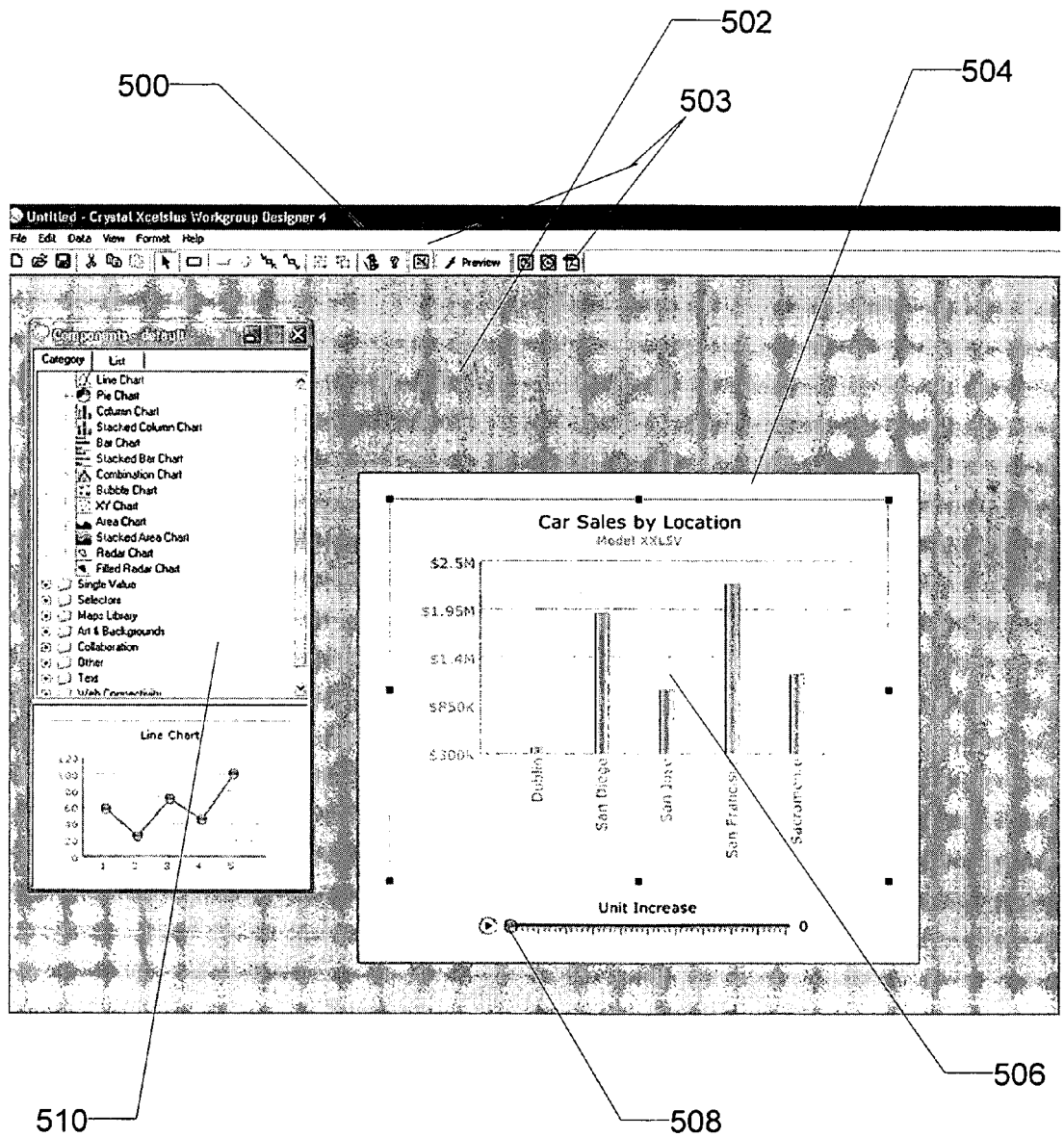
FIG. 5 illustrates an embodiment of a GUI associated with one aspect of the invention.

FIG. 5 illustrates a graphical user interface (GUI) associated with one embodiment of the invention. FIG. 5 illustrates a GUI design tool 500 that provides a canvas 502 where a user can copy provided components 510 onto the canvas and create a working file for an interactive control panel 504. In this example, a bar chart 506 and selector 508 have been added to the canvas and they are associated with data. Using either menu commands or icon commands 503, the user is able to generate an interactive control panel file either as a separate file or embedded within another application document.

Figure 6:
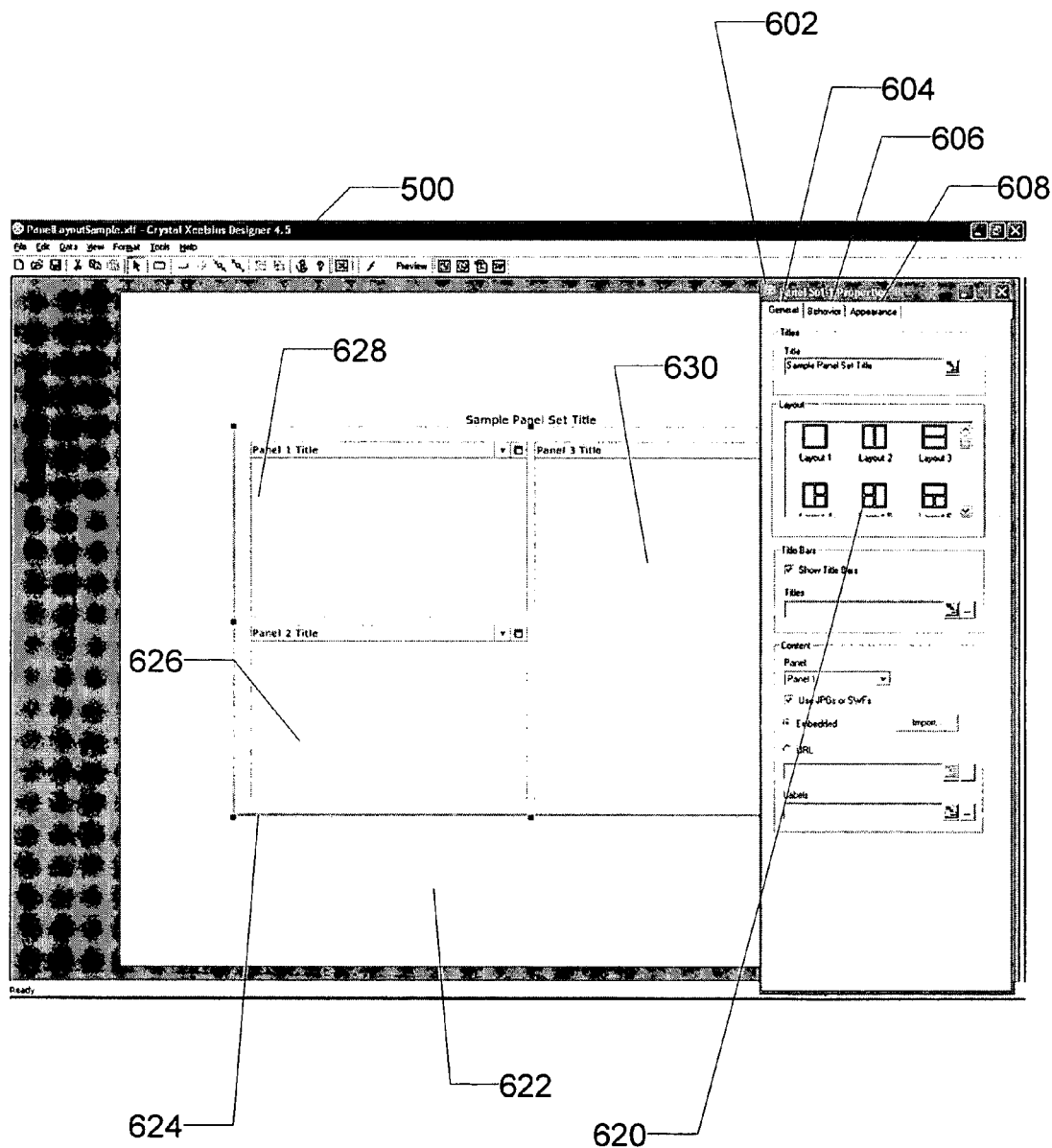
FIG. 6 illustrates a GUI of a panel layout associated with an embodiment of the invention.

FIG. 6 illustrates a graphical user interface (GUI) associated with one embodiment of the invention. A panel layout 624 has been inserted on the canvas 622. The user is able to select the layout from a range of predefined panel layout options 620. A layout with three panels 626, 628, and 630 has been specified. Using a property panel 602, the user can select the layout, titles associated with the layout, interactive control panel files and image files to associate within the panels and labels for the layers of content that can be specified for a panel. A wide range of general 604, behavior 606, and appearance 608 properties can be set. These properties include the default content to display within the panels, transition effects when switching which content is displayed, graphical settings for background skins and the like.

Figure 7:
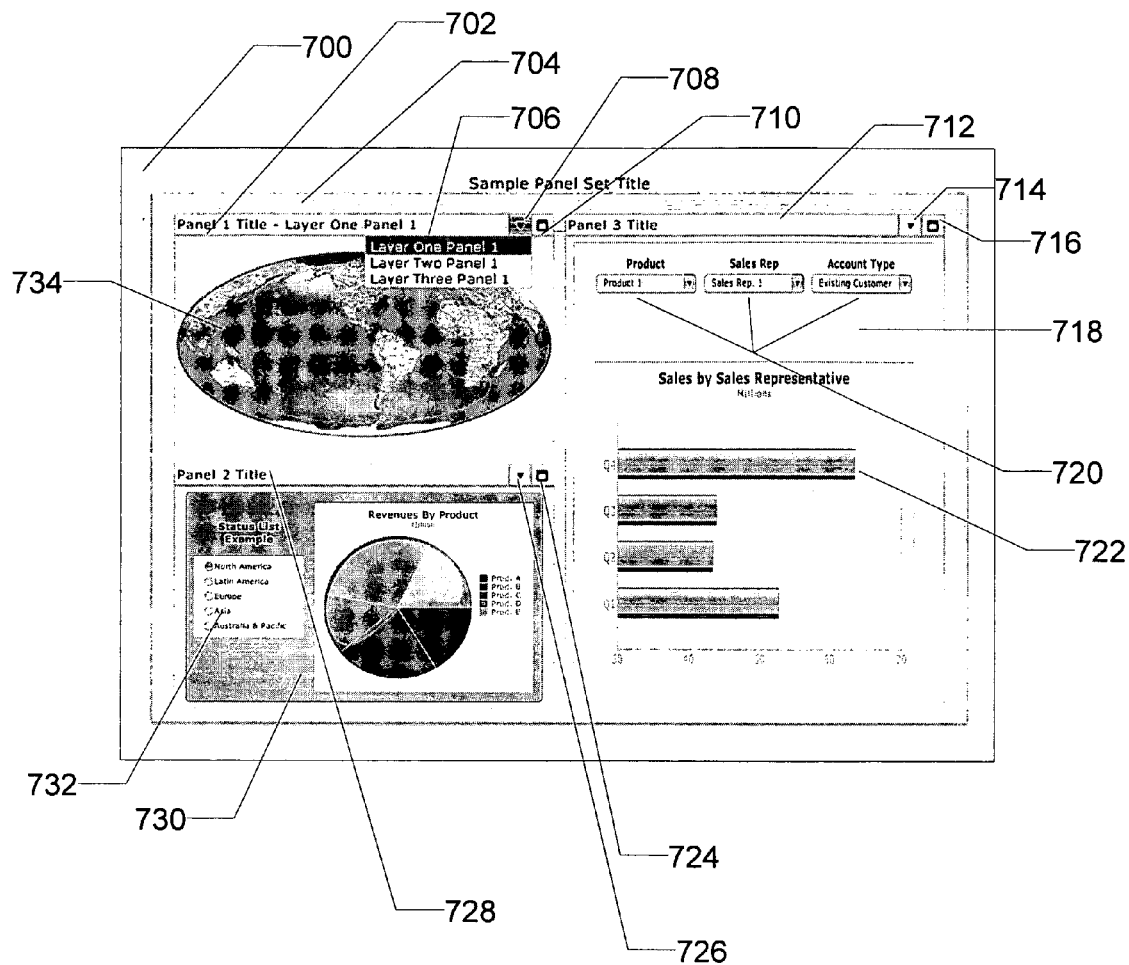
FIG. 7 illustrates a GUI of a panel layout associated with another embodiment of the invention.

FIG. 7 illustrates a graphical user interface (GUI) associated with one embodiment of the invention where an interactive control panel has been generated from the layout canvas in FIG. 6. In the generated interactive control panel the user is able to view and interact with the combined interactive control panels in a number of ways. As shown in a first panel 734, when multiple layers of content have been defined, the user can select 706 which content layer they want to have displayed and available for interaction. Additionally, the interactive functionality in the original interactive control panels is available. This functionality, such as pull down menus to select values 720 and list selectors 732 enables the end user to customize the data that is displayed. In one embodiment, in addition to the functionality available in the original interactive control panels, icons such as the expand/contract arrow 708 and the layer selection icon 706 that displays a list of available layers for a panel 710, provide additional features that are specific to a layout interactive control panel.

Figure 8:
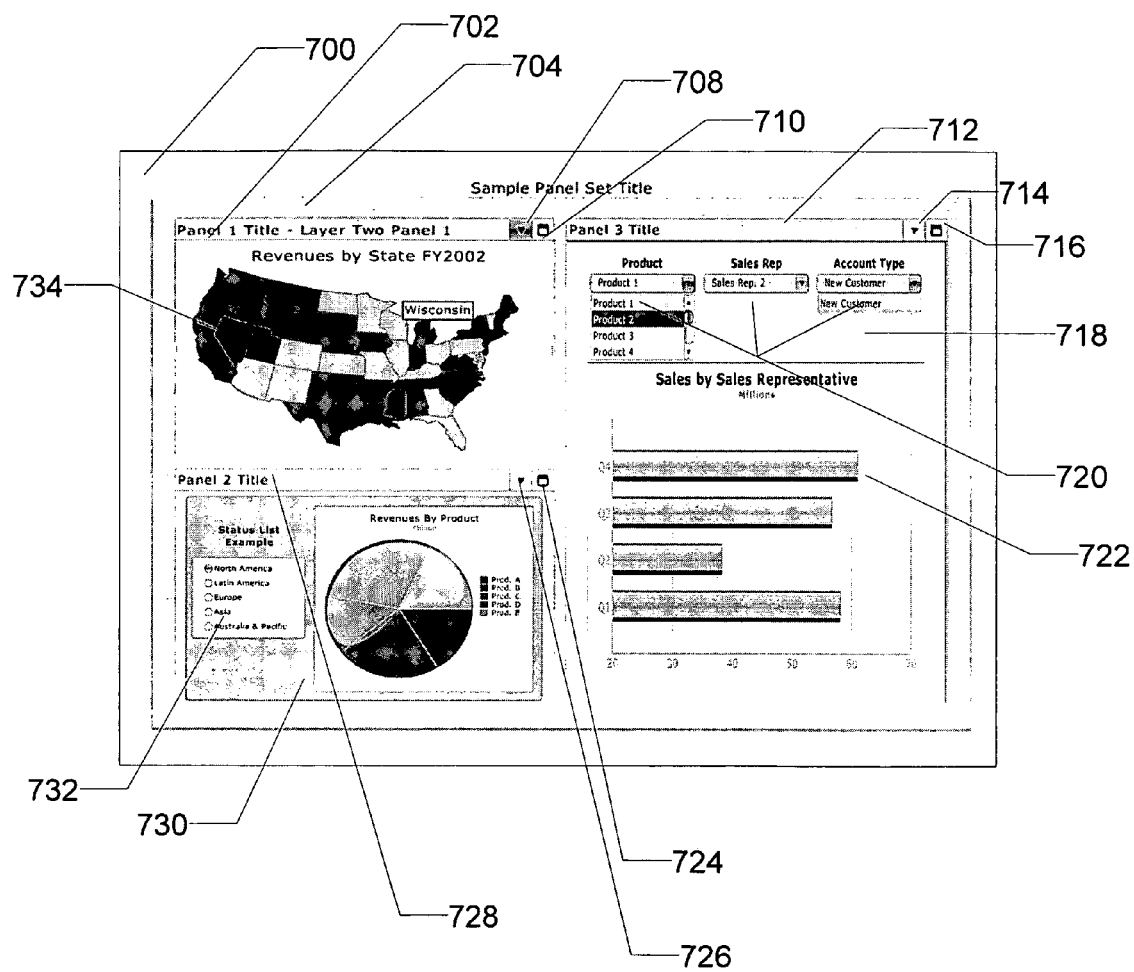
FIG. 8 illustrates altered content of the GUI panel layout of FIG. 7.

FIG. 8 illustrates toggling the interactive control panel that is displayed in the first panel 734. In this case, the second layer that contains an alerting graph map of the USA is displayed instead of the original world map graph that was displayed in FIG. 7 for layer one of panel one. Panel three 718 in FIG. 8 also illustrates user interaction with the panels in the layout interactive control panel. An end user has used the pull down menus 720 to change the data that is displayed in the graph 722.

Figure 9:
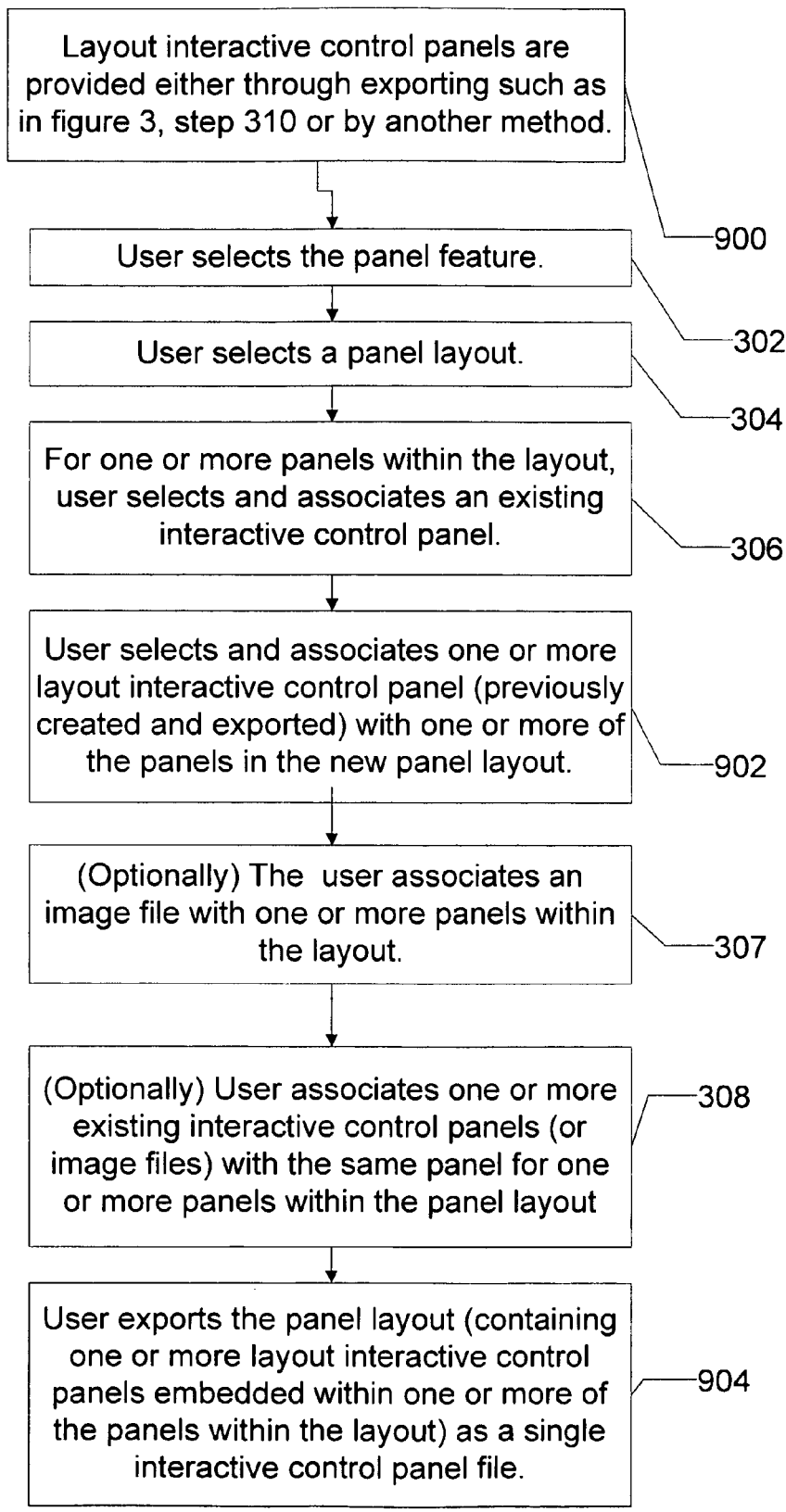
FIG. 9 illustrates a workflow for creating a layout interactive control panel where one of the panels within the layout interactive control panel contains a layout interactive control panel.

FIG. 9 illustrates the workflow for embedding a first layout interactive control panel file in a panel layout canvas to generate a second layout interactive control panel file that contains the first layout interactive control panel. This workflow is similar to the one illustrated in FIG. 3, except that one of the interactive control panels specified for a panel in the new layout interactive control panel is itself a layout interactive control panel. Initially, layout interactive control panel files are provided 900. They may be provided from a workflow such as the one illustrated in FIG. 3. As in the workflow in FIG. 3, the user selects the panel feature 302, selects a panel layout 304, and selects and associates an existing interactive control panel file 306 to a panel. In this embodiment, the designer user selects and associates one or more layout interactive control panels with one or more of the panels in the new panel layout 902. Optionally, the user associates an image file with one or more panels within the layout 307. Optionally, the user associates more than one interactive control panel, where the interactive control panel may or may not be a layout interactive control panel file, with the same panel for one or more panels within the panel layout 308. The user exports the panel layout, where the panel layout now contains one or more layout interactive control panels embedded in one or more of the panels within the panel layout as a new single interactive control panel file 904.

The user exports the panel layout where one or more layout interactive control panel files have been embedded within one or more of the panels within the layout as a single layout interactive control file 904. This new layout interactive control panel file can be provided to an end user. It functions like the interactive control panel file in FIG. 4 and the end user is able to interact with the interactive control panel content within the panels in the layout, and optionally when multiple content has been provided for a panel within the layout, the interactive panel content displayed can be toggled. Additional functionality may also be provided by the panel layout. In one embodiment of the invention, the functionality of the layout interactive control panel embedded within a panel in the second interactive layout control panel is maintained. In another embodiment of the invention, only the functionality of the main panel layout is available.

Figure 10:
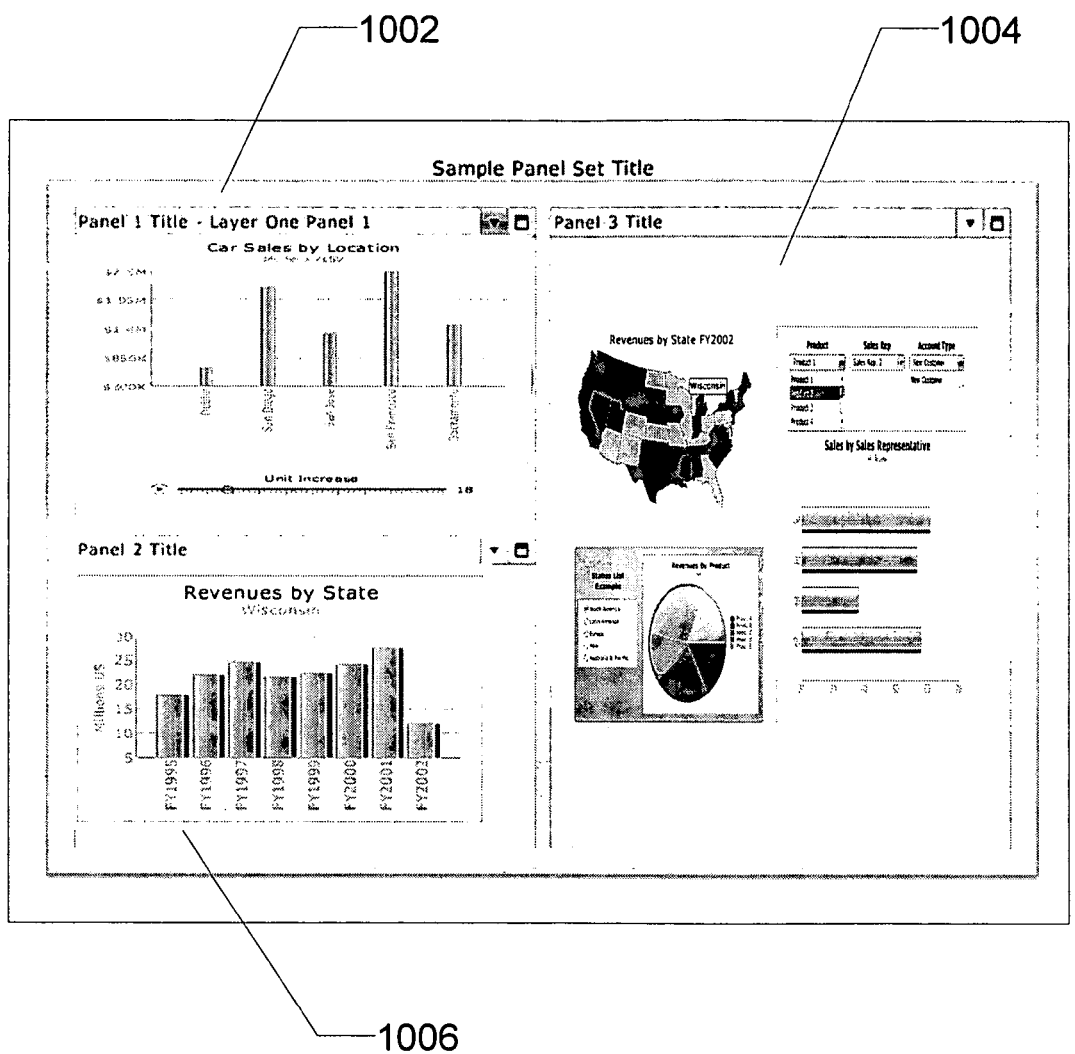
FIG. 10 illustrates another embodiment of a GUI associated with one aspect of the invention.

FIG. 10 illustrates an embodiment of the invention in which a first layout interactive control panel is embedded in a second layout interactive control panel file. In one embodiment of the invention when the layout interactive control panel is embedded in a panel in a second panel layout canvas and generated into a layout interactive control panel, the panel components in the original interactive control panel maintain individual controls to select layers, expand to fill the frame and the like. In another embodiment, as illustrated in FIG. 10, the embedded layout interactive control panel is controlled by a single set of controls, which control panels 1002, 1004, and 1006.

Figure 11:
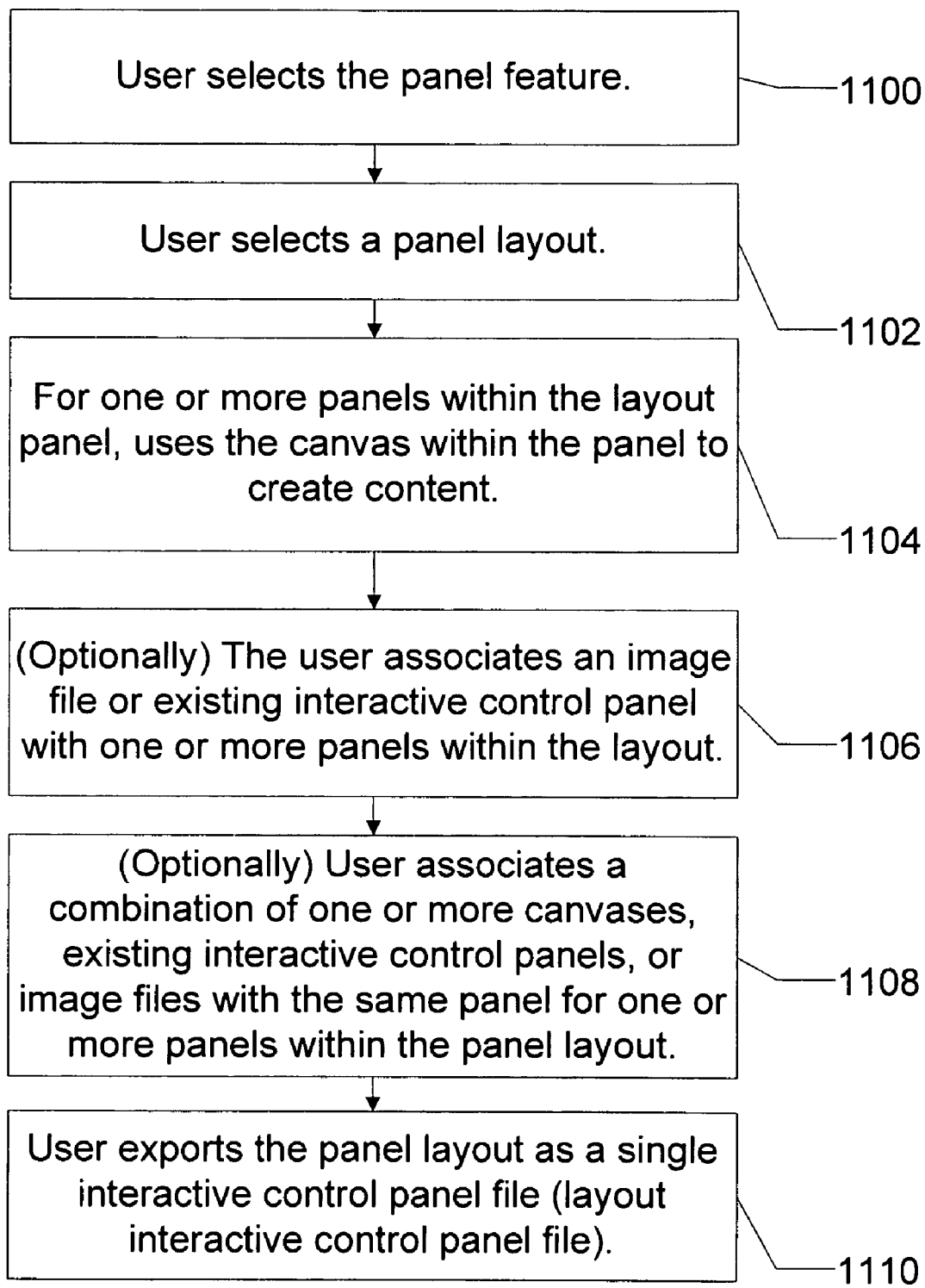
FIG. 11 illustrates a workflow associated with an embodiment of the invention.

FIG. 11 illustrates a workflow associated with an embodiment of the invention. The user selects the panel feature 1100 and selects a panel layout 1102. For one or more panels within the layout panel, the user uses the canvas within the layout to create content 1104. The user selects graphic components and associates these graphic components with data values. This interaction with the panel within the panel layout is similar to the prior art interaction with the canvas where the canvas is not part of a panel layout.

Optionally, the user associates an existing image file, or an existing interactive control panel with one or more panels within the panel layout 1106. Optionally, the user may associate a combination of one or more canvases, existing interactive control panels, or image files with the same panel for one or more panels within the panel layout 1108 such that multiple layers of content are defined for the panel within the panel layout. Any number of panels within the panel layout may have multiple layers of content defined. The user exports the panel layout as a single interactive control panel file (layout interactive control panel file) 1110. When the single interactive control panel file is generated, any content defined within the panel layout as a canvas is generated with interactive functionality.

Figure 12:
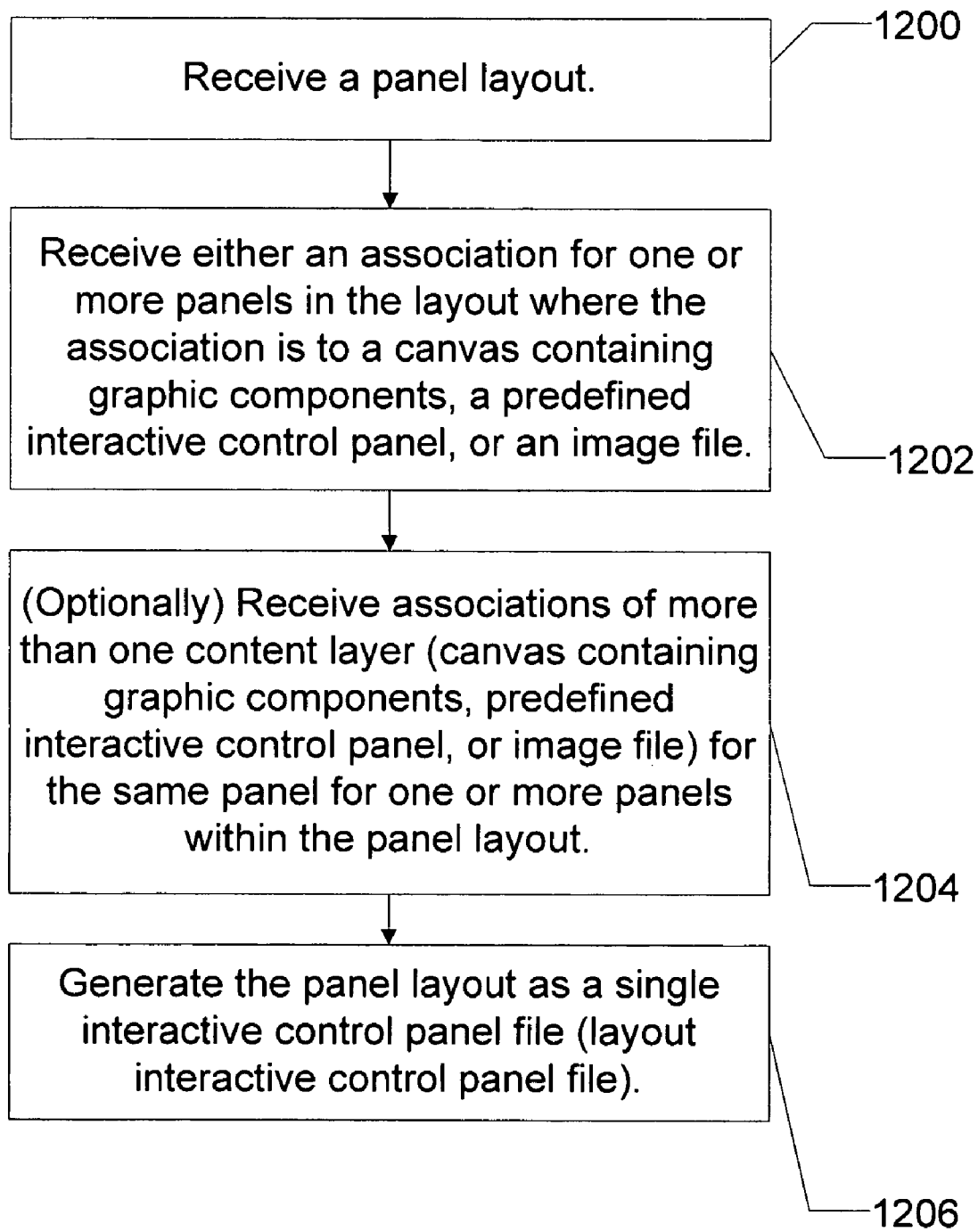
FIG. 12 illustrates an alternate workflow associated with the invention.

FIG. 12 illustrates a workflow associated with an embodiment of the invention. The interactive control panel generator module 216 receives a panel layout 1200. The panel layout may be defined by a user within the interactive control panel design module 214 by selecting a predefined panel layout, by entering values to define the panel layout, and the like. The interactive control panel generator module 216 receives associations between content and panels within the panel layout 1202. The association is to a canvas containing graphic components, a predefined interactive control panel file, or an image file. As part of the workflow, the user may define the content of the canvas using the interactive control panel design module 214. Optionally, the interactive control panel generator module 216 may receive more than one association for a panel within the panel layout 1204. For example, multiple canvases, multiple predefined interactive control panel files, multiple image files, or any combination of these may be associated with a panel within the panel layout.

The control panel generator module 216 generates a single interactive control panel file (layout interactive control panel file) for the panel layout 1206. Additional functionality to support navigating the panel layout may be included in the generated control panel file including controls for displaying different layers of content, controls for expanding a panel to fill the entire panel layout or to contract an enlarged panel to display within its original panel within the panel layout, and the like. In one embodiment of the invention, the generated interactive control panel file contains logic to toggle which layer of content is displayed in one or more panels within the panel layout automatically. This toggling may be based on an input value, a time setting, or another option. In one embodiment of the invention, the input value is supplied by another panel within the panel layout.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C#, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable medium, comprising executable instructions to:
    select a panel layout with panels specified in combination;
    select interactive graphic files representative of input and output values for panels within the panel layout, wherein each interactive graphic file is an executable file to represent an interactive graphic relationship between input data and output data;
    create multiple content layers for one or more panels;

associate the interactive graphic files with panels in the panel layout;

generate a composite interactive graphic file representative of input and output values for the interactive graphic files associated with the panel layout, wherein an output value of a first panel is processed as an input value of a second panel;

select a second panel layout;

embed the composite interactive graphic file within a panel of the second panel layout to form a new interactive control panel file; and provide the new interactive control panel file to an end user.

2. The computers-readable medium of claim 1 wherein the panel layout includes relative dimensions for the panels within the panel layout.

3. The computer-readable medium of claim 1 further comprising executable instructions to associate more than one interactive graphic file representative of input and output values for the same panel within the panel layout.

4. The computer-readable medium of claim 1 further comprising executable instructions to associate with a single panel within the panel layout, one or more interactive graphic files representative of input and output values and one or more image files.

5. The computer-readable medium of claim 1 further comprising executable instructions to associate a label with the composite interactive graphic file.

6. The computer-readable medium of claim 1 further comprising executable instructions to associate one panel in the panel layout as an interactive graphic file representative of input and output values and to associate an image file with another panel in the panel layout.

7. The computer-readable medium of claim 1 further comprising executable instructions to provide toggle controls for a panel.

8. The computer-readable medium of claim 1 further comprising executable instructions to provide controls for a user to display a panel such that it fills the entire panel layout area.

9. The computer-readable medium of claim 1 further comprising executable instructions to define a control to select a content layer of the multiple content layers.

10. A computer readable medium, comprising executable instructions to:

receive a panel layout with panels specified in combination;

receive multiple content layers for one or more panels in the panel layout;

receive associations between the panels within the panel layout and interactive graphic files, wherein the associations include an output value of a first panel being processed as an input value of a second panel, wherein each interactive graphic file is an executable file to represent an interactive graphic relationship between input data and output data;

generate a composite interactive graphic file representative of the panel layout and the associated interactive graphic files for the panels within the panel layout;

receive a second panel layout;

embed the composite interactive graphic file within a panel of the second panel layout to form a new interactive control panel file; and provide the new interactive control panel file to an end user.

11. The computer readable medium of claim 10 further comprising executable instructions to associate interactive graphic files with the same panel.

12. The computer readable medium of claim 11 further comprising executable instructions to toggle between the interactive graphic files.

13. The computer readable medium of claim 12 further comprising executable instructions to toggle in response to an input value.

14. The computer readable medium of claim 12 further comprising executable instructions to toggle in response to a time setting.

15. The computer readable medium of claim 12 further comprising executable instructions to toggle in response to an option setting.

16. The computer readable medium of claim 10 further comprising executable instructions to associate interactive graphics files and an image file with the same panel.

17. The computer-readable medium of claim 10 further comprising executable instructions to provide a display control for the panel layout.

18. The computer readable medium of claim 10 further comprising executable instructions to provide controls for a user to display a panel such that it fills the entire panel layout area.

19. The computer readable medium of claim 10 further comprising executable instructions to define a control to select a content layer of the multiple content layers.

20. A computer readable medium, comprising executable instructions to:

receive a panel layout with panels specified in combination;

receive multiple content layers for one or more panels in the panel layout;

define content for a canvas within the panel layout such that at least one graphic component produces an output value in a first panel as an input value for a second panel;

generate a composite interactive graphic file representative of the canvas and the panel, wherein the composite interactive graphic file is an executable file to represent an interactive graphic relationship between input data and output data;

receive a second panel layout;

embed the composite interactive graphic file within a panel of the second panel layout to form a new interactive control panel file; and provide the new interactive control panel file to an end user.

21. The computer readable medium of claim 20 further comprising executable instructions to define content for a plurality of canvases within the panel layout.

22. The computer readable medium of claim 21 further comprising executable instructions to toggle between content associated with a panel of the panel layout.

* * * * *